April 7, 1970   C. A. GERHARDT   3,504,620
BROILER CONSTRUCTION

Filed July 11, 1968   3 Sheets-Sheet 1

INVENTOR
Carl A. Gerhardt
by McDougall, Hersh, Scott
and Wadd
Attys

April 7, 1970   C. A. GERHARDT   3,504,620
BROILER CONSTRUCTION

Filed July 11, 1968   3 Sheets-Sheet 3

United States Patent Office 3,504,620
Patented Apr. 7, 1970

3,504,620
BROILER CONSTRUCTION
Carl A. Gerhardt, 2430 N. Bernard,
Chicago, Ill. 60647
Filed July 11, 1968, Ser. No. 744,141
Int. Cl. A47j 37/04
U.S. Cl. 99—427                          8 Claims

ABSTRACT OF THE DISCLOSURE

A broiler construction comprising a plurality of food holding means mounted on driven supports. The supports are mounted on a rotatable frame, and drive means are provided for rotating the frame, and for rotating the supports relative to the frame. The drive means for the frame include a clutch permitting disengagement of these drive means whereby the supports for the food holding means can be rotated while the frame is stationary. The food holding means comprise rectangularly shaped baskets which are large compare to the distance between respective axes but which are arranged and driven so that they can be rotated without interfering with each other.

---

This invention relates to a broiler construction for cooking food. The invention is particularly concerned with a high capacity construction suitable for use in restaurant operations or the like.

In preparing food in large quantities, for example in a restaurant operation, it is necessary to provide for control when heating the food so that different foods can be cooked to a desired degree, and so that the same type of foods can be cooked to individual tastes. It is naturally difficult to provide an automated cooking construction which will enable the desired control over the cooking of individual pieces of food included in the construction. For this reason, restaurant operations usually offer food cooked to the individual taste only when a relatively high price must be paid for the food. On the other hand, automated operations provide for high volume and low cost; however, individual control of the product cannot be maintained.

It is a general object of this invention to provide an improved broiler construction which is capable of handling a large volume of food, and which can be operated so that individual food portions can be cooked with a high degree of control.

It is a more specific object of this invention to provide a construction of the type described which can be manufactured at a relatively low cost, which can be operated through the use of basic operating parts so that a high degree of skill is not required for operation and maintenance, and which will produce food products of high quality.

These and other objects of this invention will appear hereinafter, and for purposes of illustration but not of limitation, specific embodiments of the invention are shown in the accompanying drawings in which.

Figure 1:
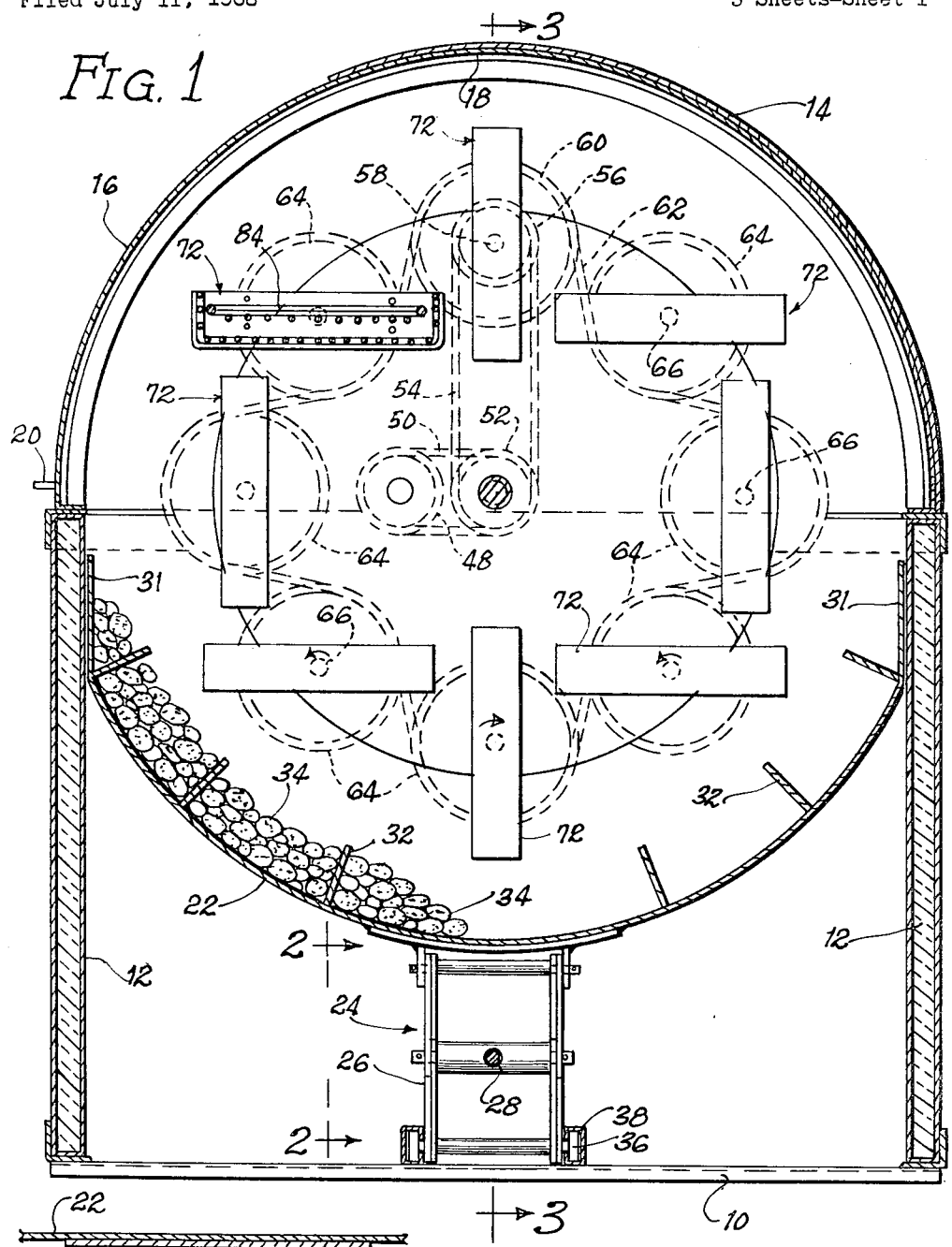
FIGURE 1 is a vertical sectional view of the construction taken about the line 1—1 of FIGURE 3.

The construction of this invention comprises a broiler having a bed for holding hot coals or other heating means. A rotating frame is positioned above the bed, and a plurality of food holding means are supported on the frame. A motor is provided for rotating the frame, and additional drive elements are included for rotating each of the food holding means relative to the frame. Clutch means are associated with the drive means whereby the drive elements for the frame can be disengaged while rotation of the individual food holding means is continued.

The food holding means may comprise a variety of elements, for example, a spit or similar conventional devices. In a preferred form of the invention, however, the food holding means comprise baskets which contain the food and which are particularly desirable for large volume operations. For example, the baskets are suitable for holding a number of hamburger patties or a number of individual pieces of chicken. Adjustment of the basket size is contemplated to accommodate different foods.

The construction shown in the drawings comprises a floor 10 and upstanding side walls 12. These side walls are insulated as shown, and it will be understood that other portions of the construction may be insulated where desired.

A curved hood 14 rests on the upper edges of the side walls, and a sliding door 16 is associated with the hood. Suitable tracks 18 are provided so that the hood can be lifted by means of a handle 20 for access to the interior of the construction.

Figure 2:
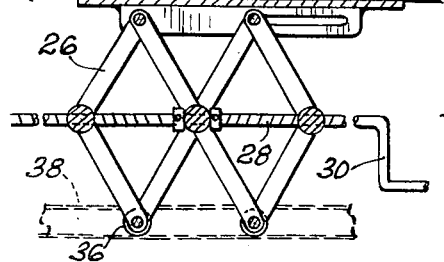
FIGURE 2 is a fragmentary view of a jack mechanism taken about the line 2—2 of FIGURE 1.

A pan 22 is held above the floor 10 by means of a scissor jack 24. As shown in FIGURE 2, the jack comprises a plurality of arms 26 which when moved inwardly and outwardly by means of the screw 28 serve to raise and lower the pan 22. The handle 30 may extend outwardly of the housing so that movement of the pan can be accomplished without discomfort. The side walls 31 of the pan preferably fit against the side walls 12 of the construction so that the pan will be maintaned in proper position while still being free for movement.

A plurality of ribs 32 preferably extend upwardly from the bottom surface of the pan for insuring a relatively even distribution of coals 34 over the surface of the pan. As shown, the ribs prevent the coals from collecting only at the bottom of the pan.

The jack 24 is mounted on wheels 36 which ride in tracks 38 located on the floor 10. In this way, the entire pan can be moved outwardly through doors located at 40 (FIGURE 2). This facilitates loading and cleaning of the pan.

Figure 3:
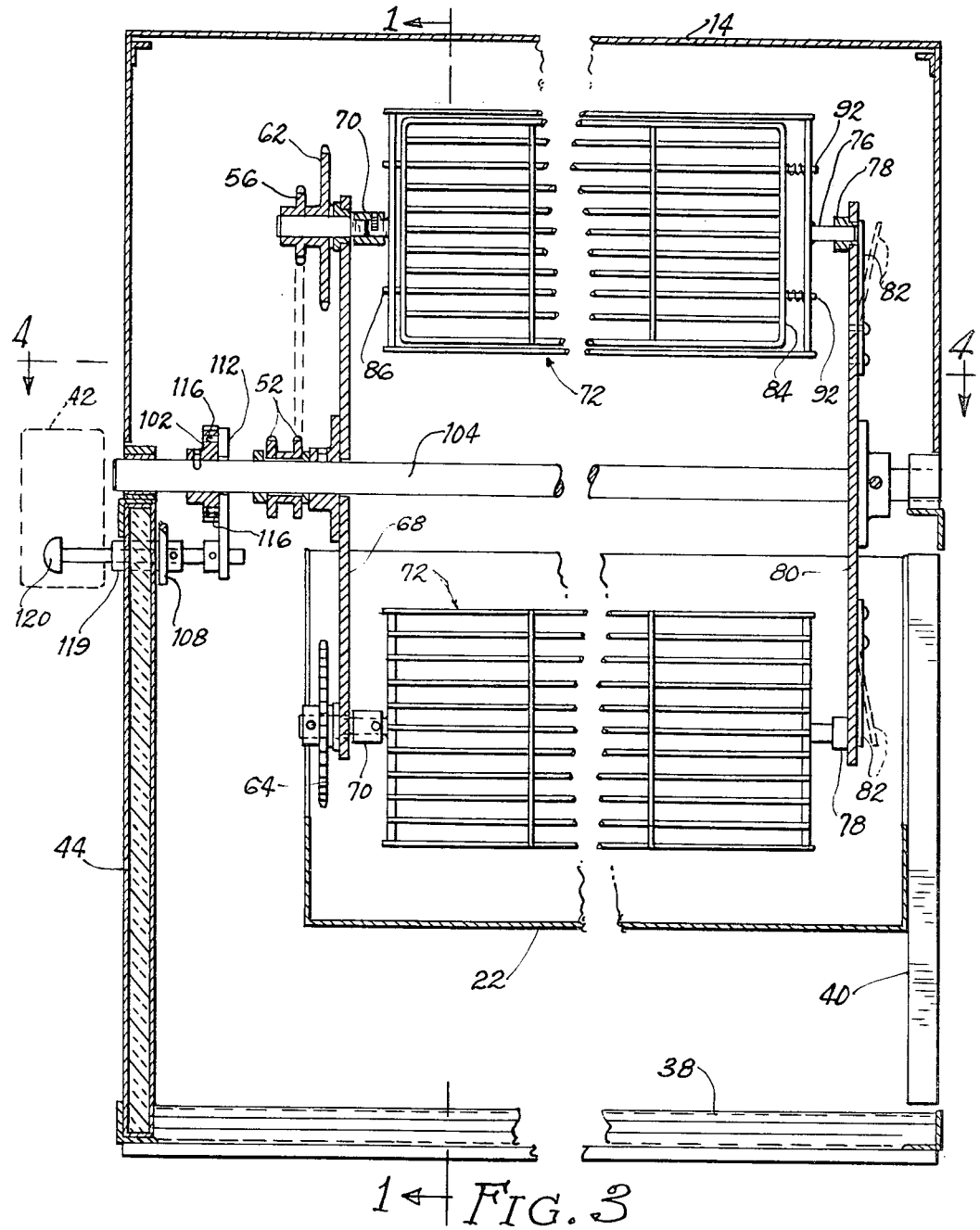
FIGURE 3 is a cross-sectional view of the construction taken about the line 3—3 of FIGURE 1.
Figure 4:
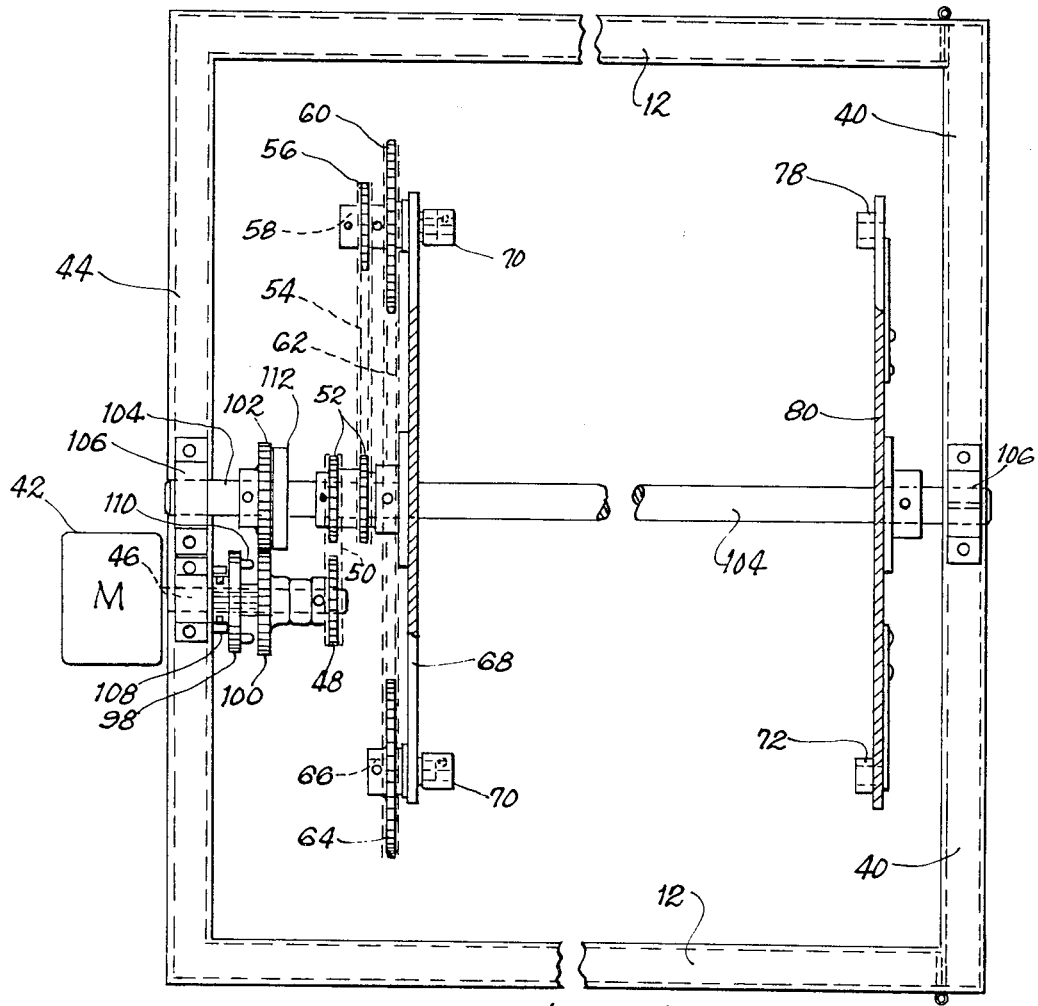
FIGURE 4 is a horizontal sectional view taken about the line 4—4 of FIGURE 3; and, FIGURE 5 is a detail view, partly in section, of a food holding basket of the type contemplated by the invention.
Figure 5:
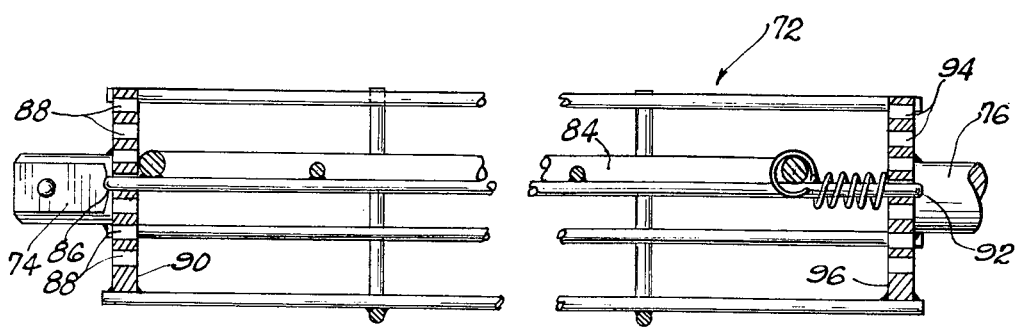

A drive motor 42 is secured to end wall 44 as best shown in FIGURES 3 and 4. The shaft 46 of the drive motor extends through the wall 44, and a sprocket 48 is secured on the end of this shaft. A chain 50 extends to a free running double sprocket 52, and chain 54 extends from the double sprocket to sprocket 56. This sprocket is tied on a shaft 58 which also carries larger sprocket 60. A long chain 62 extends from the sprocket 60 to a plurality of similar sprockets 64. Each of the sprockets 64 is mounted on a shaft 66, and each shaft extends through frame element 68. Retainer sockets 70 are tied to the ends of the respective shafts 66. It will be appreciated that rotation of the sprockets 60 and 64 will result in rotation of each of the sockets 70.

It will also be noted when considering FIGURE 1 that adjacent sprockets 64 counter-rotate with respect to each other. A basket construction 72 is associated with each socket. In the embodiment shown, a ball joint 74 is attached at the end of each basket for interfitting with the sockets 70. The opposite ends 76 of the baskets are adapted to be passed through sleeves 78 which are secured to frame member 80 in opposed relationship with respect to the sockets 70. A leaf spring 82 is attacher on the outside wall of the frame member 80, and this leaf spring will yield when a basket end 76 is passed through a sleeve 78; however, the spring will serve to confine the basket once the end 74 is fit into a socket 70.

The baskets 72 have lateral dimensions which exceed the distance between the rotational axes of adjacent baskets. When the baskets are located in the construction, however, they are disposed in a manner such as shown in FIGURE 1, so that adjacent baskets will not interfere with each other during rotation. Various arrangements are possible to prevent such interference as long as adjacent baskets counter-rotate. A suitable arrangement calls for mounting of the baskets in 90° relationship relative to each other and in such case, interference will not occur. This arrangement provides maximum utilization of the available space within the construction so that maximum efficiency in operation will result.

Each basket comprises a rectangularly shaped wire frame construction having a removable top 84. This top includes projections 86 at one end which are received in openings 88 defined in the end wall 90 of the baskets. Projections 92 formed at the opposite end of the basket top are received in similar openings 94 defined by the end wall 96. It will be appreciated that with this arrangement, the basket top can be located at different levels depending upon the size of the food products inserted in the basket.

The drive shaft 46 also carries a sliding clutch 98 which is movable toward and away from free running gear 100. The gear 100 meshes with gear 102 which is tied to the shaft 104. The frame members 68 and 80 are secured to the shaft 104, and the ends of the shaft are supported by bearings 106. A clutch yoke 108 is attached to the clutch 98 to move the clutch toward and away from the gear 100. The clutch includes pins 110 adapted to be received in holes defined by the gear 100. The clutch is keyed to the shaft 46 so that it can be moved along the shaft; however, it is tied to the shaft for rotation therewith.

An additional sliding clutch 112 having pins 116 is associated with the gear 102 to serve as a brake means. The clutch 112 is maintained in a fixed position with the shaft 104 being rotatable within the clutch. When the clutch is moved into engagement with the gear 102, the shaft 104 is brought quickly to a halt. This braking means eliminates the necessity for waiting for the shaft to gradually come to a stop.

The yoke 108 and clutch 112 may be mounted on a common supporting rod 118 as shown in FIGURE 3. The rod 118 is reciprocal within cylinder bearing 119 and is adapted to be moved back and forth by means of handle 120. It will be apparent that when the clutch 98 is moved into position for engagement with the gear 100, then the clutch 112 will be moved out of braking position. On the other hand, return movement will release the clutch 98 from driving engagement while moving the brake 112 into operating position.

In the operation of the construction, one or more of the baskets 72 may be loaded with food and located in place on the frame. If several baskets have been loaded, then the clutch 98 will be engaged so that the motor 42 will drive the frame as well as imparting individual rotating movement to each of the baskets. On the other hand, if only one, two or three baskets are filled, then the clutch 98 can be disengaged so that the motor 42 will only operate to rotate the individual baskets. By locating these baskets in a desired position relative to the bed of coals, uniform heating can be accomplished, and the baskets will remain in substantially the same position throughout the cooking operation. The bed can of course, be raised and lowered through the use of the jack 24 to provide desired heating conditions. In this connection, temperature indicating means may be located in the construction for purposes of determining the best position of the bed of coals. If desired, automatic operation of the bed could be accomplished through the use of suitable temperature control means.

The construction of the invention is particularly desirable from the standpoint of the quality of the cooked products. In this connection, it will be appreciated that with the wire baskets shown, and with the frame members rotating, drippings from the upper baskets will fall onto the food in the lower baskets to provide an automatic basting system. It is recognized that this will produce significantly improved flavor during cooking.

It will be understood that various changes and modifications may be made in the above described construction which provide the characteristics of this invention.

That which is claimed is:

1. In a broiler construction wherein food holding means are mounted on a plurality of driven supports, and wherein heating means are located adjacent the path of movement of said supports for heating said food, the improvement wherein said supports are mounted on a rotating frame, motor means for first drive elements operatively connected to said frame for rotating the frame, and second drive elements operatively connected to said supports for rotating the supports relative to the frame, and clutch means for disengaging said first drive elements from said motor means whereby said supports are adapted to be rotated while said frame remains stationary.

2. A construction in accordance with claim 1 including additional clutch means associated with said first clutch means, said additional clutch means being adapted to engage said first drive elements for applying braking action thereto as said first clutch means are disengaged from said first drive elements.

3. A construction in accordance with claim 1 wherein said food holding means comprise rectangularly shaped baskets, said second drive elements operating so that adjacent baskets counter-rotate relative to each other.

4. A construction in accordance with claim 3 wherein said baskets are removably attached to said frame, and including a removable top for said baskets, and means for securing said top at various positions relative to the floor of the baskets whereby food products of different sizes can be firmly held by the baskets.

5. A construction in accordance with claim 4 wherein said baskets comprise an open mesh construction whereby drippings from baskets located on an upper portion of the frame will fall onto the food products in baskets located at a lower portion of the frame.

6. A construction in accordance with claim 1 wherein said heating means comprises a pan for supporting hot coals, said pan being mounted on a jack whereby the position of the pan relative to the path of movement of the food holding means can be adjusted.

7. A construction in accordance with claim 6 wherein said pan includes side wall portions extending into contact with the side walls of the broiler construction for maintaining the pan in position while permitting movement relative to the side walls.

8. A construction in accordance with claim 1 wherein said food holding means comprise baskets having lateral dimensions in excess of the spacing between the rotational axes of adjacent baskets, said baskets being adapted to be mounted at 90° angles with respect to each other on said frame, said second drive elements operating to counter-rotate adjacent baskets whereby the baskets will not interfere with each other during movement within the construction.

References Cited

UNITED STATES PATENTS

| | | | |
|---|---|---|---|
| 2,619,026 | 11/1952 | Scott | 99—443 XR |
| 2,735,358 | 2/1956 | Gilbert | 99—427 |
| 2,885,952 | 5/1959 | Campbell. | |
| 2,983,218 | 5/1961 | Persinger et al. | 99—427 |
| 3,040,730 | 6/1962 | Hurko et al. | |
| 3,125,015 | 3/1964 | Schlaegel. | |

WALTER A. SCHEEL, Primary Examiner

A. O. HENDERSON, Assistant Examiner